Jan. 13, 1970    F. DANZART    3,489,302
GARBAGE COLLECTOR TRUCK
Filed March 14, 1967    3 Sheets-Sheet 2
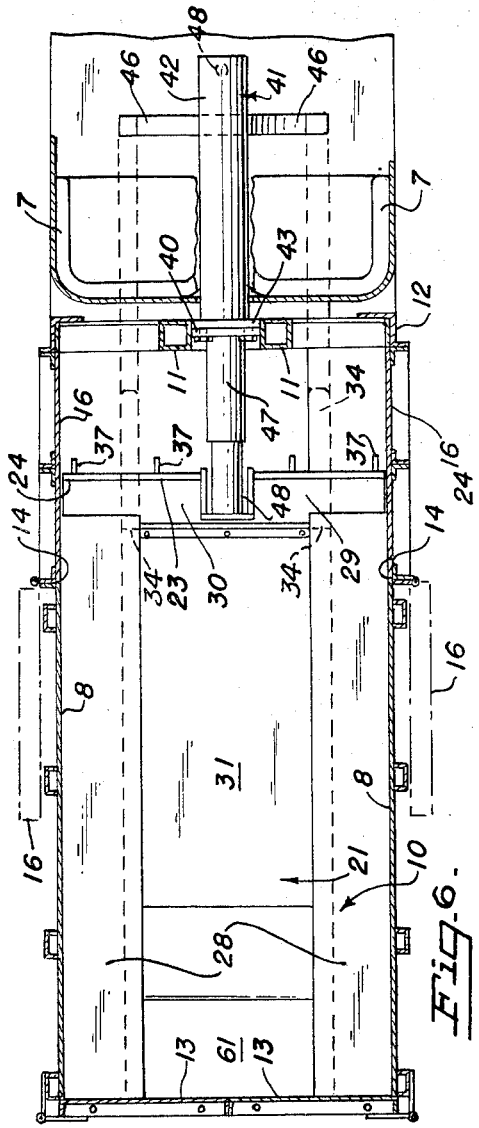
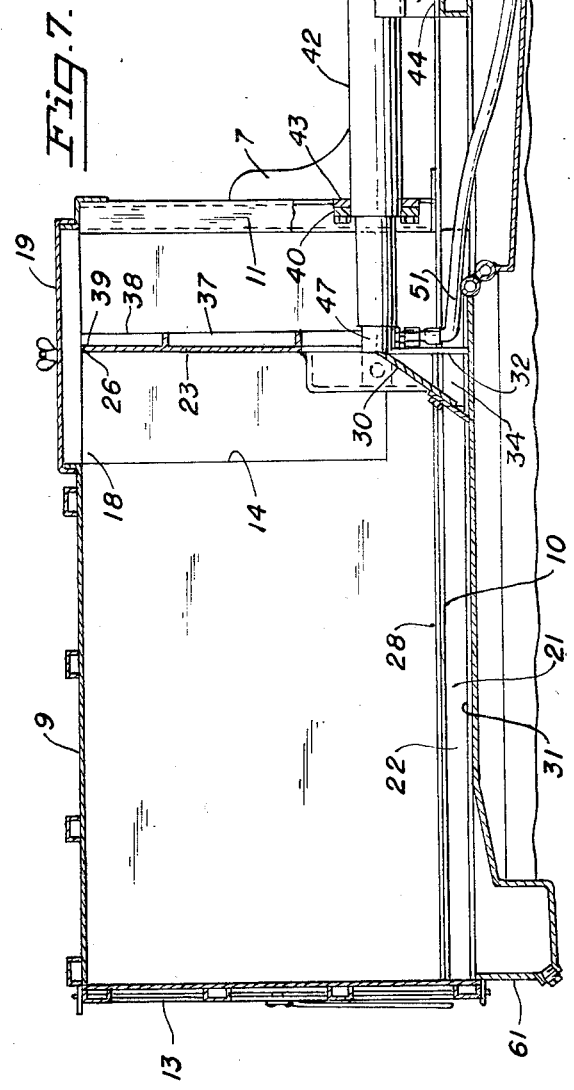
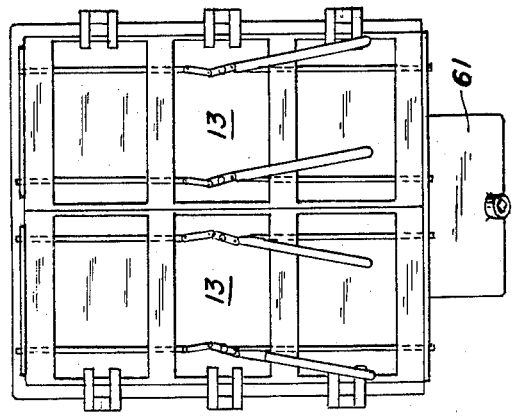
INVENTOR
FRANK DANZART
BY George B White
ATTORNEY Jan. 13, 1970  F. DANZART  3,489,302
GARBAGE COLLECTOR TRUCK
Filed March 14, 1967  3 Sheets-Sheet 3
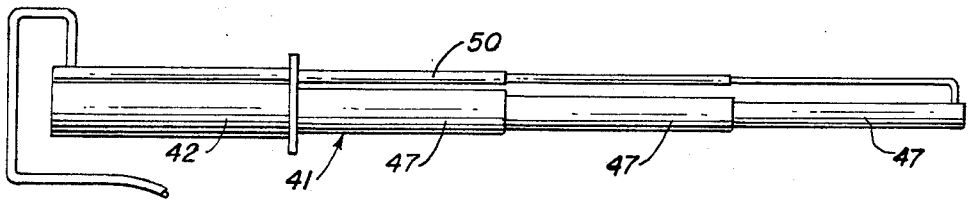
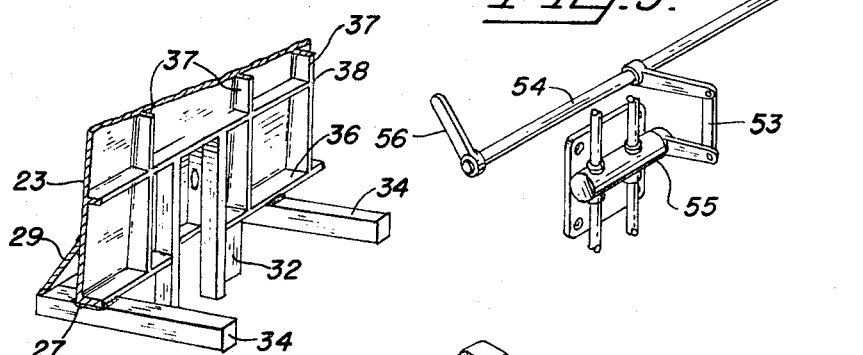
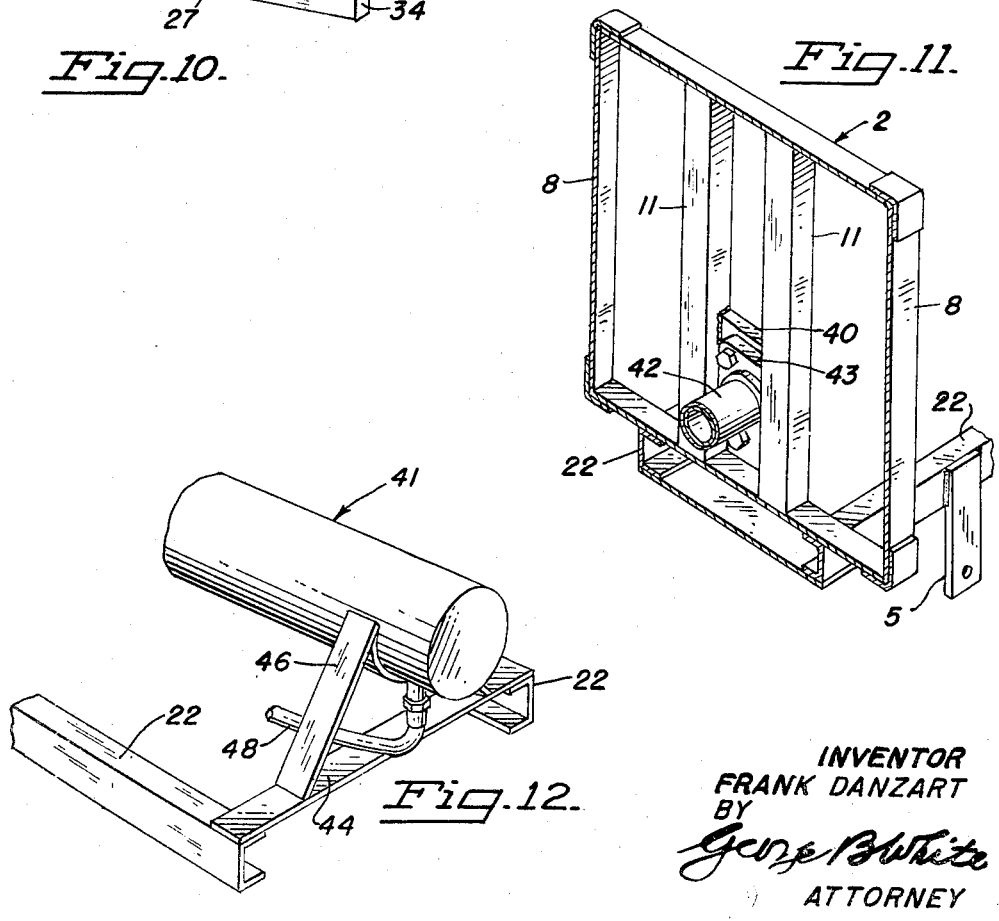
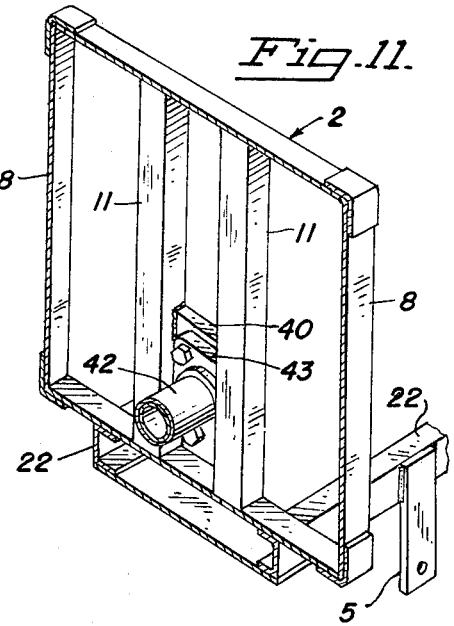
INVENTOR
FRANK DANZART
BY
*George B White*
ATTORNEY

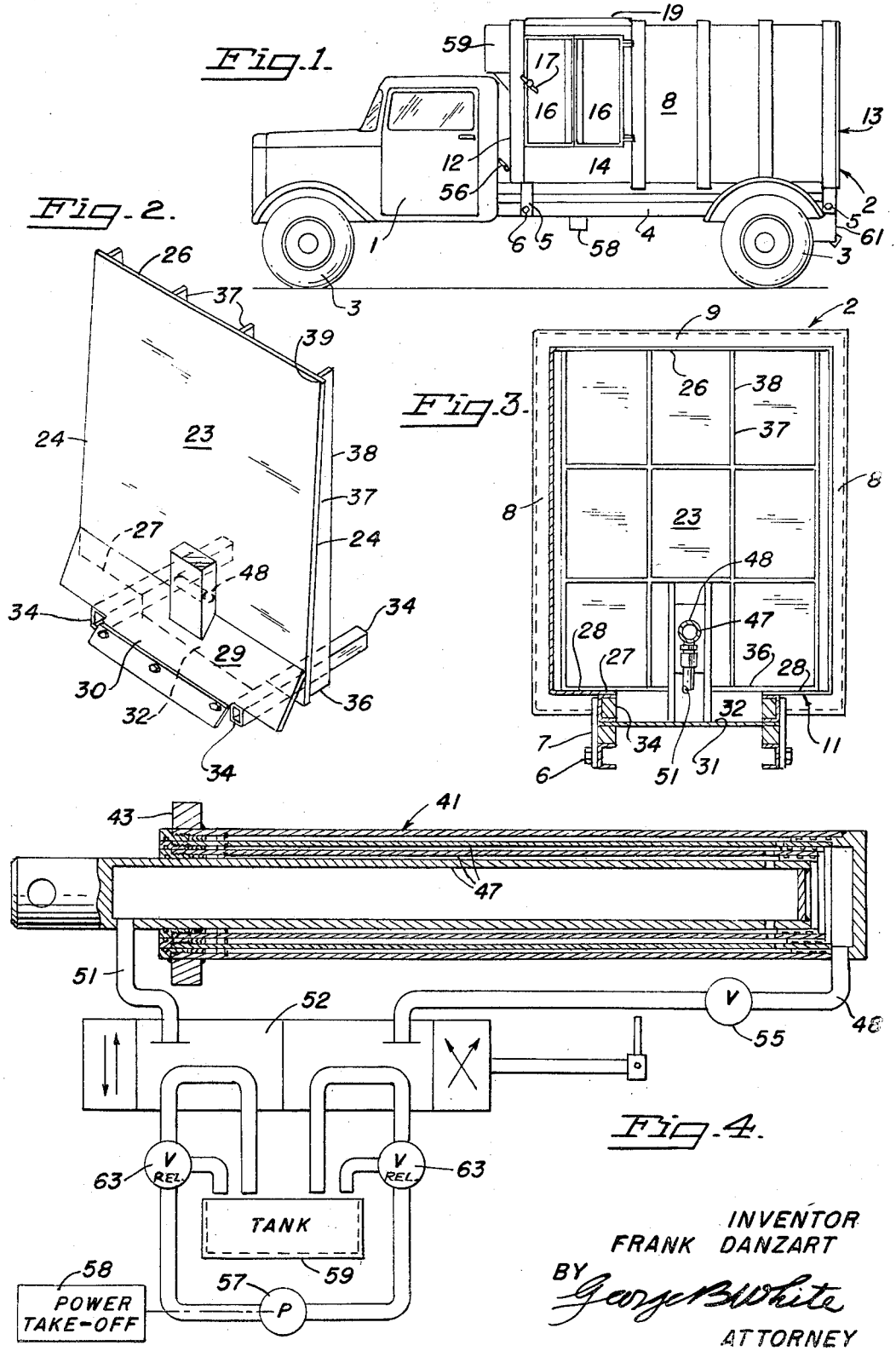

United States Patent Office 3,489,302
Patented Jan. 13, 1970

---

3,489,302
GARBAGE COLLECTOR TRUCK
Frank Danzart, P.O. Box 96,
Guerneville, Calif. 95446
Filed Mar. 14, 1967, Ser. No. 628,214
Int. Cl. B65f 3/00
U.S. Cl. 214—83.3                    7 Claims

ABSTRACT OF THE DISCLOSURE

This disclosure shows in a truck body a compacting plate operated by a telescoping hydraulic ram from the cab of the truck rearward in the body, the cylinder of the ram being located substantially completely in the cab between the seats, and the outermost ram section being connected to said plate, thereby to utilize the full length of the body for the compacted garbage.

PRIOR ART

In the prior art the majority of sanitary or garbage trucks have a rather complicated rear end loading and compressing device; centain other types of trucks heretofore known had side loading, but the compactor plates are so manipulated that the compressing mechanism projects into the useful space of the truck body and reduces the capacity of the truck body sometimes by as much as one-third.

BRIEF SUMMARY OF THE INVENTION

Features of the invention include the provision of a garbage truck body which can be loaded from either side and in which the garbage can be packed or compacted by a plate extended across the entire cross-sectional area of the body and so positioned and formed as to direct the garbage upwardly so as to compact along the entire area of the compacting plate; means being provided to positively guide and prevent the tilting of the compacting plate; said side-loading openings being near the front end of the body and being provided with doors to be closed at will, and an openable top is provided adjacent said side openings for top loading in front of the compactor plate whenever the body is filled up to the side openings, thereby to increase the capacity of the truck body; by having the cylinder and the telescopic ram mounted on the forward end of the truck body and located in the cab, practically the entire interior of the truck body throughout its full length can be used to carry compacted garbage or the like; further features of the invention are the easy control and connection from the cab to control the hydraulic pump through a suitable valve mechanism, and controls for manipulating the valve so as to selectively admit fluid under pressure to the forward end of the telescopic ram to telescope the sections of the ram into the cylinder, or to by-pass the flow at such times when the compactor plate is at a standstill.

I am aware that some changes may be made in the general arrangements and combinations of the several devices and parts, as well as in the details of the construction thereof without departing from the scope of the present invention as set forth in the following specification, and as defined in the following claims, hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a side view of the complete truck.
FIG. 2 is a perspective view of the compactor plate.
FIG. 3 is a cross-sectional view of the body on the truck frame.
FIG. 4 is a sectional view of the telescopic ram with a diagram of fluid pressure system.
FIG. 5 is a rear view of the truck body and frame.
FIG. 6 is a longitudinal sectional plan view of the truck.
FIG. 7 is a longitudinal sectional side view of the truck.
FIG. 8 is a modified arrangement of the collapsible conduit on the ram.
FIG. 9 is a fragmental perspective view of the valve manipulating mechanism.
FIG. 10 is a fragmental perspective view showing the relation of the shoes to the compactor plate.
FIG. 11 is a perspective, partly sectional view of the forward end of the truck body.
FIG. 12 is a perspective view of the saddle for the ram cylinder.

The garbage truck herein has the usual cab 1 and body 2 supported on wheels 3 and a truck frame 4. The body 2 is connected to the truck frame 4 by bracket plates 5 welded to the to the body 2 and bolted by suitable bolts 6 to the frame 4. The cab 1 has in it a pair of seats 7 spaced from one another as shown in FIG. 6, and it has the usual engine or prime mover and controls in the cab 1.

The body 2 is elongated and it has sides 8, a top 9, a bottom 10, a forward end formed by spaced vertical channels 11 and a frame 12 and reinforced removable gates or rear doors 13.

There are opposite loading openings 14 near the forward end of the body 2 which can be, at will, blocked or firmly closed by side doors 16 securely held in place by suitable releasable clamps 17.

There is a top opening 18 between the side openings 14 which is covered by a suitable reinforced and clamped top closure 19.

The sides and top have even and smooth inside surfaces. In the bottom 10 there is provided a longitudinal well 21 which extends the entire length of the body 2. Along the opposite sides of the well 21 are provided a pair of channel guides 22 facing one another. These channel guides 22 extend beyond the forward end and into the cab 1 under the seats 7 in said cab 1. The channel guides 22 rest on the frame 4 and the bracket plates 5 are welded on the outside of the channel guides 22, so that the entire body 2 can be removed by loosening the bolts 6.

Inside the body 2 is a compactor plate 23 the outline of which corresponds substantially to the inside cross-sectional contour of the body 2. The vertical edges 24 of the compactor plate 23 slide along the sides 8 of the body 2. The top edge 26 of the compactor plate 23 slides under and along the top 9 of the body 2. The lower edge 27 of the compactor plate 23 slides on the shoulders 28 of the bottom 10 on the opposite sides of the well 21. A downwardly and rearwardly inclined skirt 29 extends from a line spaced above the lower edge 27 of the compactor plate 23 to the bottom shoulders 28 and it has a central tongue 30 formed thereon which projects into and rides in the well 21 in contact with the well bottom 31.

The compactor plate 23 has a central plate tongue 32 extended into the well 21. A pair of parallel shoes 34 are welded on the edges of the plate tongue 32. The shoes 34 are formed of generally rectangular cross-section slideably fitting into the respective channel guides 22. The shoes 34 are spaced below the lower edge 27 of the plate 23 so that the space between the lower edge 27 of the plate 23 and the tops of the shoes 34 slideably straddles the tops of the channel guides 22 and the shoulder 28. These shoes project rearwardly as well as forwardly to a sufficient distance to resist any tendency for tilting the compactor plate 23 under pressure. A base flange 36 extends along the lower edge 27 of the compactor plate 23 on the side facing toward the forward end of the body 2. From this base flange 36 extended a plurality of vertical reinforcing bars or plates 37, the forward edges 38 of which are substantially perpendicular to the bottom 11 of the body 2, but the rear edges 39 thereof, to which the compactor plate 23 is welded, taper forwardly and upwardly so as to hold the plate in slightly inclined position upwardly and forwardly in the body. This arrangement in combination with the inclined skirt 29 will assist in spreading the compressed garbage upwardly and along the entire area of the compactor plate 23.

For the reciprocation of the compactor plate 23 there is provided a telescoping ram 41. A ram cylinder 42 of the ram 41 has its end flange 43 mounted on a plate 40 secured between the vertical channels 11 of the body 2 so as to be held solidly in position, as shown in FIG. 11. The ram cylinder 42 projects from the forward end of the body 2 forwardly and into the cab 1 between the seats 7. A cross plate 44 is provided under the seats 7 transversely across the cab 1 on the top of the forward ends of the channel guides 22. A bracket saddle 46 is supported on the cross plate 44 between the seats 7 on which bracket saddle rests the forward end of the ram cylinder 42 with a degree of freedom of play that may be caused due to the strains and stresses on the ram cylinder 42 and on the forward end of the body 2. In the ram cylinder 42 are the telescoped ram sections 47. In the present illustration there are three ram sections 47 telescoped into one another and then into the ram cylinder 42. The end of the smallest ram section 47 is suitably mounted on a bracket 48 fixed on the compactor plate 23 spaced above the lower edge 27 and above the skirt 29. A hose connection 48 at the forward end of the ram cylinder 42 and a suitable collapsible conduit such as hose connection 51 at the rear end of the smallest telescoping ram section 47 convey fluid under pressure for the extending or telescoping of the ram sections 47 and thereby pushing the compactor plate 23 toward the rear doors 13 of the body or pulling the compactor plate 23 back toward the forward end wall 12 respectively. Such collapsible conduit may be inside the cylinder and in the telescoping ram sections or be telescoping along the ram sections or be a loose hose as shown in FIG. 7. The telescopic conduit 50 for this connection is shown in FIG. 8.

The hose connections 48 and 51 are connected to a suitable valve 52, shown in FIG. 4, which valve 52 is operated by a bell crank lever 53, shown in FIG. 9, mounted below the forward end frame 12. An oscillating bar 54 is suitably journalled to extend to one side of the truck body 2 with a handle 56 thereon for turning the bar 54 and thereby turning the bell crank lever 53 for turning the valve 52 from a neutral by-pass position into connection to the respective hose connections 48 or 51 alternately. An adjustable restrictor valve 55 is interconnected in the hose 48 so as to maintain a constant predetermined pressure on the compactor plate 23 when the compactor plate 23 is pressed toward the door 13. This restrictor valve 55 is in the nature of a usual reducing valve.

The fluid pressure is provided through a suitable rotary pump 57, driven by the usual power take off 58 which latter is connected to the usual transmission to be shifted in the usual manner of power take offs from the cab 1. A suitable fluid tank 59 is provided to furnish the fluid to the rotary pump 57 and to receive the by-pass fluid.

In operation the garbage or refuse is loaded from one or both sides through th side openings 14 and periodically the handle 56, the oscillating bar 54 and bell crank lever 53 are turned thereby turning the valve 52 so as to pump fluid under pressure through the hose connection 48 to the forward end of the ram cylinder 42, whereupon the ram sections 47 are extended and push the compactor plate 23 toward the rear doors 13. The valve 52 is provided with safety by-pass relief valves 63 of a suitable type which by-pass the fluid after a predetermined pressure in either conduit, thereby to prevent the breaking of the doors 13. Then the handle 56 is turned so as to turn the oscillating bar 54 and the bell crank lever 53 in the opposite direction so as to direct the fluid pressure through the valve 52 to the other hose connection 51 to the rear end of the smallest ram section 47 to telescope the ram sections together and into the ram cylinder 42 thereby to pull the compactor plate 23 back into the initial position adjacent the forward end frame 12 of the body 2. This operation is repeated until the compacted refuse is at about the side openings 14. At this time the side doors 16 are closed and clamped in position and the top closure 19 is opened so that refuse may be loaded behind the compactor plate 23 and further load compacted so as to completely fill the body 2 practically to the forward end frame 12, namely to the initial position of the compactor plate 23 adjacent the forward end frame 12. The body 2 is of such length relatively to the length of the truck, that at least about sixty percent of the length of the body is between the front and rear wheels of the truck so that the center of gravity of the body is always between the front and rear wheels, For unloading the compacted refuse the rear doors 13 are opened and the compactor plate 23 is operated in the manner heretofore described to push the compacted refuse out through the rear opening of the body 2 uncovered by said rear doors 13.

Near the rear end of the well 21 there is provided a sump 61 to receive and collect any juices that might collect on the bottom. The juices squeezed out of the compacted refuse, all around the edges of the compactor plate 23 also serve in the nature of lubricants. Thus the compactor plate 23 is positively supported, easily operated, all operating mechanisms for the compactor plate 23 are outside of the space into which the refuse is compacted and the loading of the body 2 practically throughout its entire length is permitted.

I claim:
1. In a garbage collector truck,
   (a) a truck frame on front and rear wheels,
   (b) a cab at the forward end of the frame for the power plant and driving parts and controls of the truck,
   (c) a body on the frame behind the cab having sides and a top and a bottom,
   (d) said body having loading openings on the sides adjacent said cab,
   (e) an openable closure covering the rear end of the body,
   (f) a compactor plate conforming generally to the internal contour of the body being reciprocable longitudinally in said body from an initial position adjacent said cab to said closure and back,
   (g) power driven means in said cab connected to said plate for reciprocating said plate in said body,
   (h) a manipulable mechanism to control said power driven means,
   (i) said power driven means including a ram cylinder mounted on the end of the body adjacent said cab and projecting into and contained entirely in said cab,
   (j) and telescopic ram sections initially concealed in said ram cylinder, the outermost ram section being connected to said compactor plate for reciprocating said plate in said body,
   (k) a pair of seats in the cab spaced from one another,
   (l) a cross support in the cab transversely across under the seats,
   (m) a bracket saddle on the cross support, said ram cylinder resting on said bracket saddle between the seats with limited freedom of movement.

2. In a garbage collector truck, (a) a truck frame on front and rear wheels, (b) a cab at the forward end of the frame for the power plant and driving parts and controls of the truck, (c) a body on the frame behind the cab having sides and a top and a bottom, (d) said body having loading openings on the side adjacent said cab, (e) an openable closure covering the rear end of the body, (f) a compactor plate conforming generally to the internal contour of the body being reciprocable longitudinally in said body from an initial position adjacent said cab to said closure and back, (g) power driven means in said cab connected to said plate for reciprocating said plate in said body, (h) a manipulable mechanism to control said power driven means, (i) the bottom of said body having a longitudinal well along about the middle thereof, providing shoulders on the opposite sides of said well, (j) a channel guide along each side of said well, said channel guides being mounted on said frame and extending into said cab, the said channel guides facing one another so as to form guides along the opposite sides of said well, (k) and shoes mounted on said compactor plate extending longitudinally into said channel guides for maintaining said plate in upright position in said body.

3. The invention defined in claim 2 and (l) a base flange on said compactor plate extended toward the forward end of the body, (m) a plurality of vertical flanges integrated with said flange and with the forward face of said compactor plate; the edge of each flange integrated with the forward face of the plate being inclined upwardly and forwardly of the body to hold said plate inclined for directing the compacting of the garbage upwardly.

4. The invention defined in claim 2 and (l) a base flange on said compactor plate extended toward the forward end of the body, (m) a plurality of vertical flanges integrated with said flange and with the forward face of said compactor plate, the edge of each flange integrated with the forward face of the plate being inclined upwardly and forwardly of the body to hold said plate inclined for directing the compacting of the garbage upwardly, (n) the lower edge of said plate riding on said shoulders and having a portion extending into said well, said shoes being secured on said portion, (o) each shoe being of substantially rectangular cross-section fitting into the respective channel guides.

5. The invention defined in claim 2, and (l) a base flange on said compactor plate extended toward the forward end of the body, (m) a plurality of vertical flanges integrated with said flange and with the forward face of said compactor plate; the edge of each flange integrated with the forward face of the plate being inclined upwardly and forwardly of the body to hold said plate inclined for directing the compacting of the garbage upwardly, (n) a skirt inclined rearwardly and downwardly from the compactor plate and projecting into said well for exerting an upward compacting component force.

6. The invention defined in claim 2, and (l) a downwardly inclined bottom in said well near the rear end of said body, (m) a container below said inclined bottom communicating with said well for collecting liquids pressed out of the compacted garbage.

7. In a garbage collector truck, (a) a truck frame on front and rear wheels, (b) a cab at the forward end of the frame for the power plant and driving parts and controls of the truck, (c) a body on the frame behind the cab having sides and a top and a bottom, (d) said body having loading openings on the sides adjacent said cab, (e) an openable closure covering the rear end of the body, (f) a compactor plate conforming generally to the internal contour of the body being reciprocable longitudinally in said body from an initial position adjacent said cab to said closure and back, (g) power driven means in said cab connected to said plate for reciprocating said plate in said body, (h) a manipulable mechanism to control said power driven means, (i) spaced guide channels formed in the bottom of said body, (j) guide elements on said plate guided in said guide channels and maintaining said plate in substantially upright position in said body, (k) said body being supported on said guide channels and said guide channels being supported on said frame, (l) detachable securing elements connecting the respective channels to the truck frame for permitting the rearward removal of the entire body from the truck frame and from the cab when said securing elements are detached.

References Cited

UNITED STATES PATENTS

| | | | |
|---|---|---|---|
| 1,908,899 | 5/1933 | Kayel | 214—82 XR |
| 2,258,988 | 10/1941 | LeLaurin | 214—82 |
| 2,800,234 | 7/1957 | Herpich et al. | 214—82 |
| 2,912,128 | 11/1959 | Kamin | 214—82 |
| 3,137,400 | 6/1964 | Tapp et al. | 214—82 |
| 3,170,578 | 2/1965 | Moreland | 214—82 |
| 3,198,355 | 8/1965 | Kamin | 214—82 |
| 3,366,255 | 1/1968 | Evans | 214—82 XR |

ALBERT J. MAKAY, Primary Examiner

U.S. Cl. X.R.

214—82